(12) United States Patent
Parisi

(10) Patent No.: US 10,175,562 B2
(45) Date of Patent: Jan. 8, 2019

(54) SUPPORT AND CONNECTION UNIT FOR CAMERAS

(71) Applicant: SPARK S.R.L., Reggio Emilia (IT)

(72) Inventor: Giovanni Parisi, Cavriago (IT)

(73) Assignee: SPARK S.R.L., Reggio Emilia (IT)

( * ) Notice: Subject to any disclaimer, the term of this patent is extended or adjusted under 35 U.S.C. 154(b) by 0 days.

(21) Appl. No.: 15/612,398

(22) Filed: Jun. 2, 2017

(65) Prior Publication Data

US 2017/0357146 A1 Dec. 14, 2017

(30) Foreign Application Priority Data

Jun. 10, 2016 (IT) .................. 102016000059514

(51) Int. Cl.
| | | |
|---|---|---|
| *G03B 17/56* | (2006.01) | |
| *F16M 13/02* | (2006.01) | |
| *F16M 11/04* | (2006.01) | |
| *H01R 13/24* | (2006.01) | |
| *G08B 13/196* | (2006.01) | |
| *H04N 5/225* | (2006.01) | |
| *H04N 7/18* | (2006.01) | |

(52) U.S. Cl.
CPC ......... *G03B 17/561* (2013.01); *F16M 11/041* (2013.01); *F16M 13/02* (2013.01); *G08B 13/19619* (2013.01); *H01R 13/24* (2013.01); *H04N 5/2251* (2013.01); *H04N 7/18* (2013.01)

(58) Field of Classification Search
USPC ...................................... 396/427; 248/187.1
See application file for complete search history.

(56) References Cited

U.S. PATENT DOCUMENTS

| | | | | |
|---|---|---|---|---|
| 6,637,952 B2 * | 10/2003 | Arbuckle | ............... | G03B 17/02 348/143 |
| 6,698,942 B2 * | 3/2004 | Ward | ..................... | F16M 11/08 396/421 |
| 7,599,000 B2 * | 10/2009 | Lai | ......................... | F16M 11/08 348/373 |
| 7,755,668 B1 * | 7/2010 | Johnston | .............. | H04N 5/2251 348/148 |
| 7,855,728 B2 * | 12/2010 | Aoki | ..................... | F16M 11/10 348/143 |

(Continued)

FOREIGN PATENT DOCUMENTS

WO 2006012524 A1 2/2006

*Primary Examiner* — Clayton E Laballe
*Assistant Examiner* — Warren K Fenwick
(74) *Attorney, Agent, or Firm* — Pearne & Gordon LLP

(57) ABSTRACT

The support and connection unit (1) of a camera (10), comprises: a first part (2) intended to be fixed to an installation surface, for example a wall, comprising a first electronic means (21) for the conveyance of signals and provided with connectors (22, 23, 24) for the transmission of signals outwardly, and a second part (3), intended to be coupled to a camera (10), comprising a second electronic means (31), connectable to the first electronic means (21) and adapted to convey the signals produced by the camera (10). The first and the second part (2, 3) may be removably coupled, defining a closed container (25, 32) which houses the first and the second electronic means (21, 31). The first and the second electronic means (21, 31) are placed in the respective part (2, 3) so as to mutually connect following the coupling of the first and the second part (2, 3).

13 Claims, 6 Drawing Sheets

(56) References Cited

U.S. PATENT DOCUMENTS

| | | | |
|---|---|---|---|
| 8,382,387 B1* | 2/2013 | Sandoval | G03B 29/00 |
| | | | 348/143 |
| 2007/0126871 A1 | 6/2007 | Henninger et al. | |
| 2008/0013944 A1* | 1/2008 | Yamane | F16M 11/10 |
| | | | 396/427 |
| 2008/0055409 A1* | 3/2008 | Mars | G03B 37/02 |
| | | | 348/143 |
| 2010/0284682 A1* | 11/2010 | Chen | G03B 17/00 |
| | | | 396/427 |
| 2011/0021255 A1* | 1/2011 | Kim | H01Q 1/242 |
| | | | 455/575.1 |
| 2013/0147963 A1* | 6/2013 | Henninger, III | |
| | | | G08B 13/19619 |
| | | | 348/159 |

* cited by examiner

SUPPORT AND CONNECTION UNIT FOR CAMERAS

The present invention relates to a support and connection unit for cameras.

In particular, the invention relates to a universal quick coupling device for the support and wiring of cameras.

The market currently provides a multitude of different cameras, each with its own specific assembly and connection characteristics.

Even within the sector limited to digital cameras for video surveillance, many types of cameras are known that can be classified based on their use and installation modalities, such as "box", "bullet", "PTZ" and "dome" cameras, those "with housings" and many more.

Furthermore, each manufacturer provides specific versions of each type of camera, with the related assembly and wiring peculiarities.

In practice, the video surveillance sector has not adopted any standards either for the mechanical fixing of the cameras to the related support or for the wiring.

Therefore, the installation of the security cameras requires the use of specialist labour and a significant amount of time, which has a substantial impact on the costs sustained by users.

In fact, consider the case in which a surveillance system is to be provided in a large building or complex of buildings, which implies the assembly and wiring of tens or hundreds of cameras, possibly of different types, in a multitude of areas distributed inside and outside such constructions.

For each camera, the appointed personnel is required, not only to figure out how to physically mount each camera so that the field of vision covers the relevant area, as established by the design, but also to try to efficiently bring the power supply, signal and network cables, necessary for the operation of the camera, to the specific fixing position chosen.

To be precise, many cameras currently available on the market have a rear multi-pole wire that bears power supply, signal and network connectors.

It is therefore up to the specialist installer to connect each connector to the video surveillance system wires and to insert them into a protective container, so that they cannot be tampered with, said container being specific for the different applications and types of cameras.

Furthermore, the replacement or repair of the cameras is susceptible to similar problems, requiring specialist personnel to disassemble the protective container, disconnect each connector and then disassemble the camera from its physical support.

Finally, it is to be considered that cameras must often be installed in points that are not easy to reach without ladders or similar equipment and that the installation and removal operations require different tools to be used that involve both hands, making these operations not only inconvenient but, in some cases, also dangerous.

The technical task underpinning the present invention is therefore to provide a support and connection device for cameras which obviates the drawbacks of the prior art.

This technical task is attained by a support and connection device for cameras realised according to claim 1.

Further characteristics and advantages of the present invention will become more apparent from the following indicative, and hence non-limiting, description of preferred, but not exclusive, embodiments of the device of the invention, as illustrated in the accompanying drawings, in which.

Figure 1:
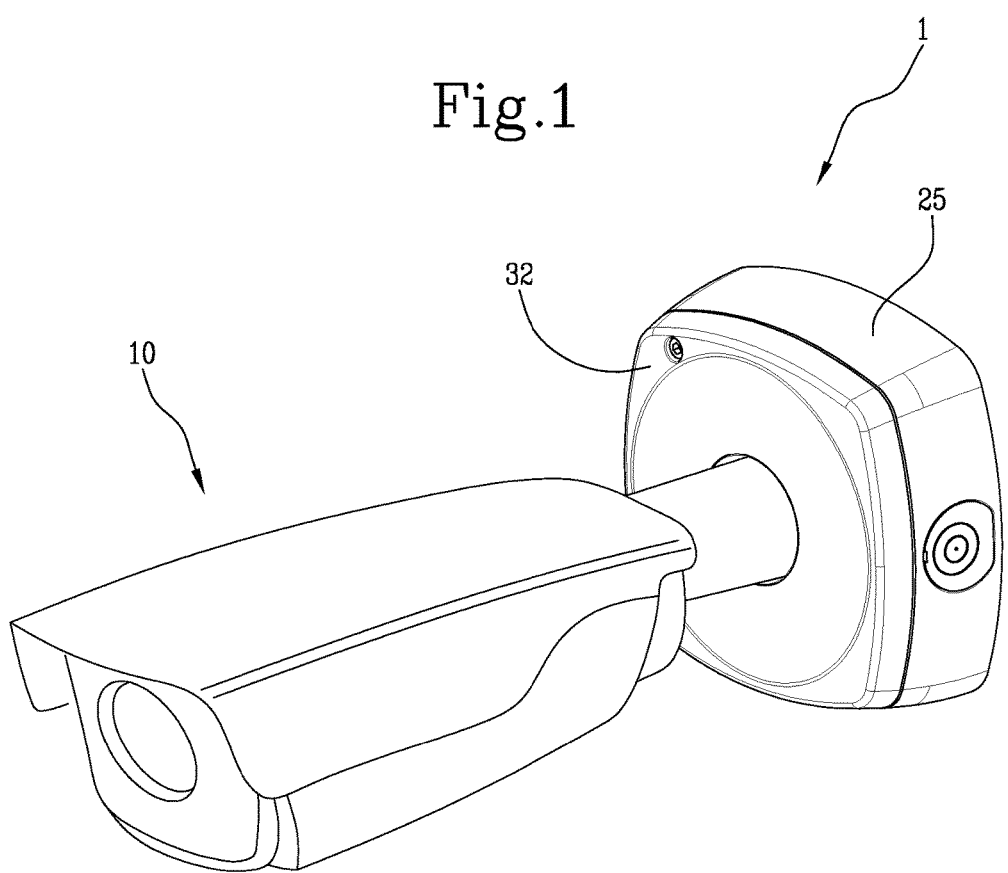
FIG. 1 is an axonometric view of the camera associated with the unit of the invention.

With reference to the above-mentioned figures reference numeral 1 indicates a support and connection unit of a camera 10.

Below, without departing from the general description, reference will be made to the particular case in which the digital camera 10 is used for video surveillance, other applications still however being possible.

In even more detail, the camera 10 may be, in a limiting but not exclusive case, of the "bullet", "PTZ", "dome" type, etc. . . . . .

The support unit 1 proposed is adapted to be fixed to a surface, for example a wall, ceiling, pole or other installation surfaces suitable for the purpose.

The unit 1 according to the invention comprises, first of all, a first part 2, intended in use to be mounted on the mentioned installation surface, the first part 2 of which constitutes the rear portion of the unit 1.

Figure 7:
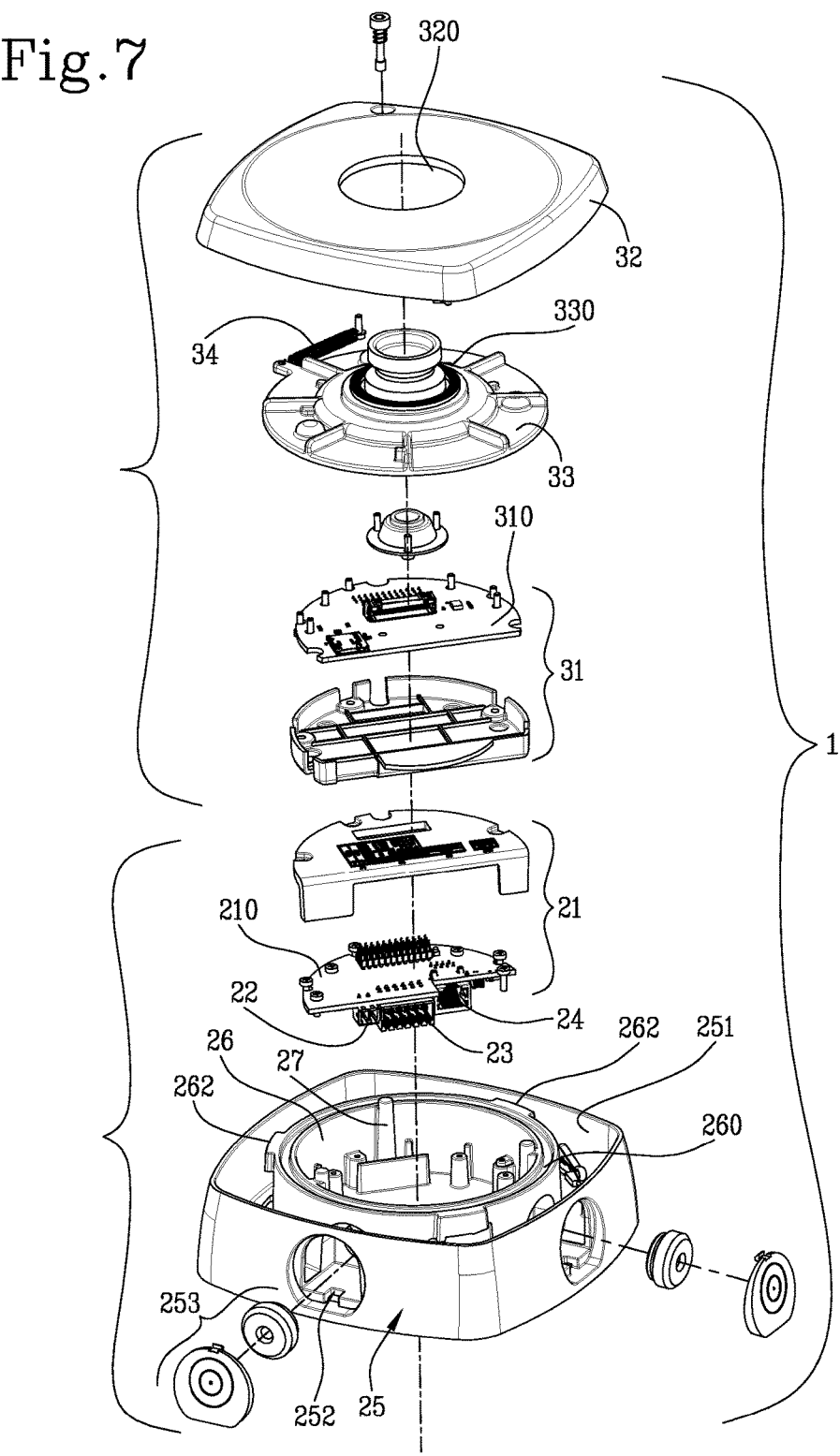
FIG. 7 is an exploded view of the proposed unit.

The first part 2 comprises a first electronic means 21 for the conveyance of signals and is provided with connectors 22, 23, 24 for the transmission of signals outwardly (see FIG. 7).

In detail, such connectors 22, 23, 24 convey the power supply current, the video signals and the network signals, i.e. related to a telecommunication network, operating, for example, based on the TCP/IP protocol or the like.

In this case, the first electronic means 21, which preferably comprises an electronic circuit board 210, is also adapted to transmit the power to the camera 10.

The invention then includes a second part 3, placed at the front, intended to be coupled to a camera 10, comprising a second electronic means 31 (which preferably includes an electronic circuit board 310) connectable to the first electronic means 21 of the rear part 2 of the unit 1 and adapted to convey the signals produced by the camera 10 (and preferably adapted to receive the power from the first means 21, for the purpose of the operation of the camera 10 itself).

This front part 3 is preferably solidly associated to the camera 10, and in particular is a single unit with the camera 10, one being integrated into the other; however, solutions are possible in which the camera 10 is coupled in a separable way to the first front part 3 through attachment means provided for that purpose.

According to an important aspect of the invention, the first and the second part 2, 3 of the unit 1 can be removably coupled to one another, to define a closed container 25, 32 which internally houses both the first and the second electronic means 21, 31.

Such container 25, 32 comprises, completely closed inside it, all the electronic means 21, 31 necessary for its operation and connection to the video surveillance system.

The container 25, 32 may be equipped with a central axis C, not necessarily an axis of symmetry.

In this case, each of the two parts 2, 3 may for example extend prevalently in the perpendicular direction to said axis C, in a generically planar way. In practice, the two parts 2, 3 of the unit 1 respectively comprise a first and a second semi-container 25, 32, for example in the form of hall-shells, which together define the outer periphery of the container, preferably having a generally polyhedral or prismatic shape.

In detail, once connected in the correct direction with respect to the central axis C, the two parts 2, 3 form a unit 1 equipped with a container 25, 32 whose outer surfaces are substantially connected flush.

Advantageously, the invention envisages the first and the second electronic means 31, 32 being placed in the respective part of the unit 1 so as to mutually connect following the coupling of the first and the second part 2, 3 themselves.

In practice, the invention provides a rear part 2 that is fixed to a wall and that comprises within it the connectors 22, 23, 24 for the connection to the video surveillance system, and a front part 3 that bears the camera 10.

The rear part 2 includes a first electronic circuit board 210 (or other means suitable for the purpose) that processes and conveys the signals and the current and that possibly performs other functions discussed below; the front part 3 comprises the operating logic of the camera 10 (for example, in the form of an electronic circuit board 310 or other means).

The two parts 2, 3 are configured so as to be coupled to define externally a protective container 25, 32 and internally a connection between the two boards 210, 310 that allows the camera 10 to be connected extremely quickly to the video surveillance network, beside allowing the operation thereof.

In detail, the two boards 210, 310 are automatically connected to one another following the coupling between the two parts of the unit 1, according to methods that will be detailed below.

The advantages of this configuration will be further addressed in the explanation of how the invention works.

In the preferred embodiment of the invention, shown in the appended figures, the first part 2 of the unit 1 comprises a bottom 250 from which perimeter containment walls 251 are rising, thus defining the first semi-container 25.

In practice, the rear part 2 comprises a main body 25 having a generally polyhedral shape, closed rearwards by the mentioned bottom 250, laterally circumscribed by its walls 251 arranged at the perimeter of the bottom 250 and open at the front, at its coupling area with the rear part 3.

This main body 25 is hollow and defines a part of the outer periphery of the container 25, 32.

The bottom 250 of the first semi-container is the part that is preferably placed in direct contact with the installation surface.

The front part 3 of the unit 1 comprises the second semi-container 32 which, once coupled with the first semi-container 25, forms therewith a single container 25, 32 that protects the electronic components for the operation of the camera 10 and for its connection to the video surveillance system.

Figure 2:
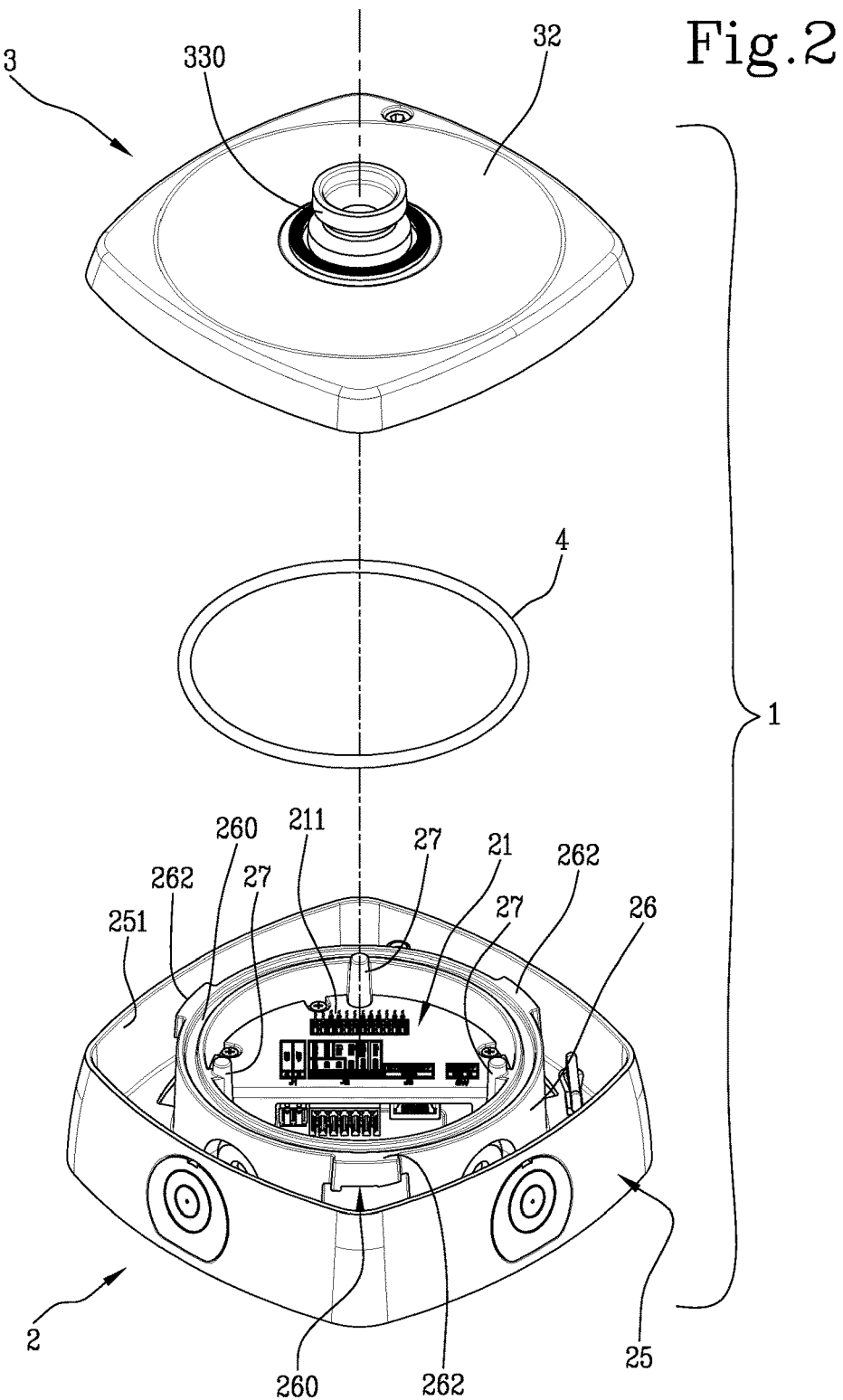
FIGS. 2 and 3 are axonometric views, from above and from below, of the two parts of the unit, separate from one another.
Figure 3:
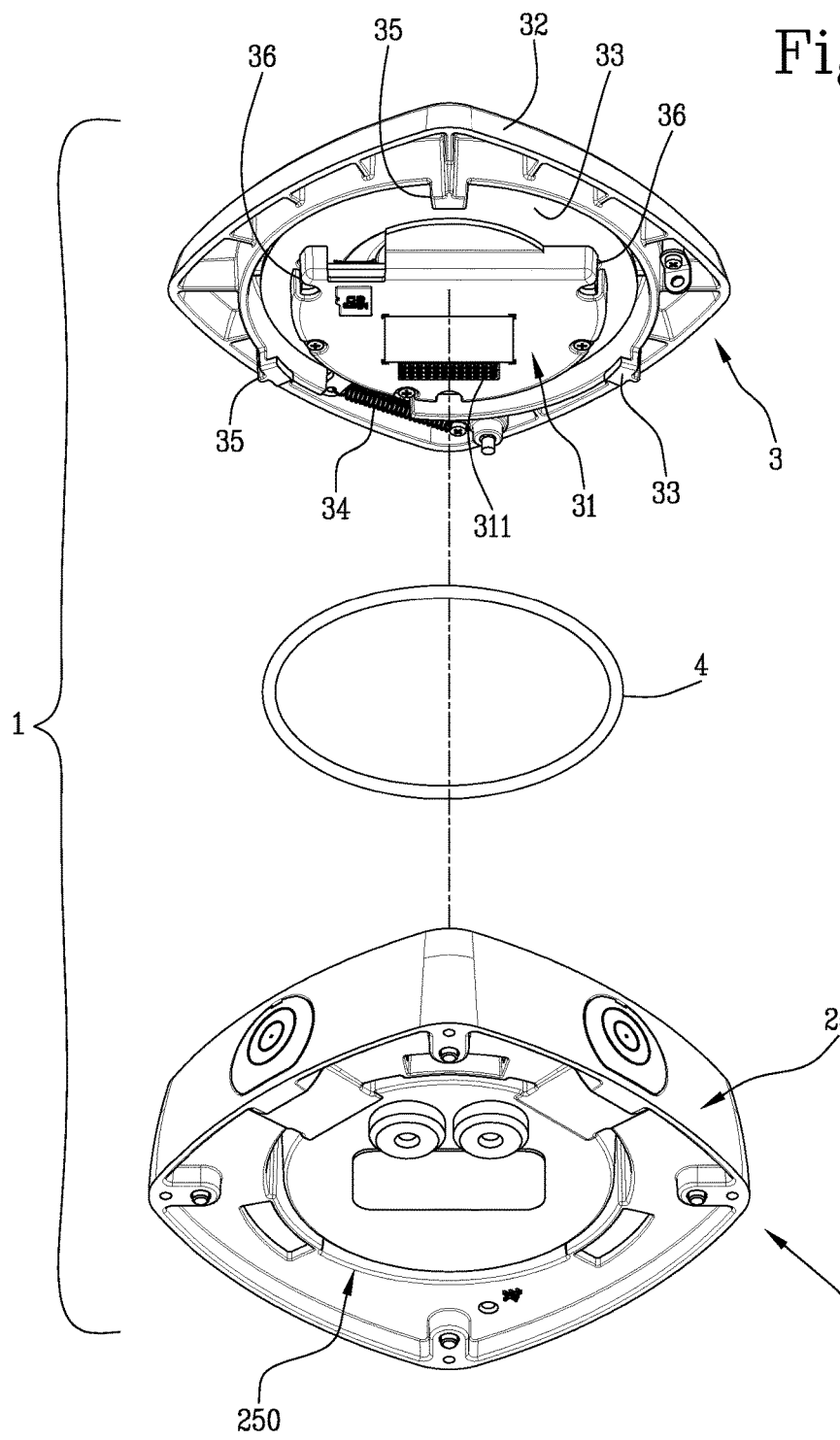

The second semi-container 32 is provided with a first front side (shown in FIGS. 1 and 2) which, in use, remains external and from which the camera 10 projects and a second, rear, side, opposite the first and preferably concave which, in use, remains internal (shown in FIG. 3).

In detail, the second semi-container 32 may be defined by a plate-shaped element that acts as a cover for the first semi-container 25.

Preferably, the unit 1 comprises a volume internal to the container 25, 32 placed, for example, in a central position, which houses the two electronic circuit boards 210, 310 connected to one another (and generally the mentioned first and second electronic means 31), when the proposed unit 1 is in its closed configuration, wherein the first and the second part 2, 3 are coupled to one another.

In detail, the second part 3 comprises one or more lateral closing walls 26 that circumscribe the first electronic means 21, defining at the front an access passage.

Preferably, the walls 26 closing the internal volume are afforded as a single piece with the main body 25 of the first aforementioned semi-container, rising from the mentioned base 250; in this case, the access passage is defined at the front side of the main body 25.

The closing walls 26 constitute a ring that, in use, covers and laterally protects the two boards 310, 210 inserted into the internal volume.

The second part 3 of the unit 1 comprises a closing element 33 having a side to which the second electronic means 31 is fixed.

The closing element 33 is arranged in the internal, or rear, side of the second semi-container 32 and is preferably plate-shaped; the face of the closing element 33 that houses the electronic means 31 is the rear or "internal" one.

The closing element 33, in use, closes the mentioned front passage of the internal volume, abutting the free edges of the lateral closing walls 36.

Preferably, the second electronic means 31 is mounted centrally on the internal face of the closing element 33 so that, once the latter has abutted the lateral closing walls 26, the second means (and in particular the second board 310) is contained in the internal volume.

In this way, an internal volume is obtained in which the two aforementioned electronic circuit boards 310, 210 are contained, preferably sealingly.

To be precise, consider that such closing walls 26 and the whole volume are completely contained and covered in the container 25, 32 of the unit 1, when it is in the closed configuration.

As shown in the appended figures, it is possible to provide a sealing gasket 4 arranged between the walls and the closing element 33 of the internal volume.

In the case in which the wall 26 and the closing element 33 are circular, as in the embodiment shown in the figures, the mentioned gasket may be an O-ring 4 housed for example in an annular groove 260, which may be afforded at the free edge of the annular closing wall 26.

In this way, the unit 1 according to the invention ensures that the electronic means, in particular the two electronic circuit boards 210, 310 mentioned various times, are protected from damp and in general from contact with water or external agents.

Preferably, the first and the second electronic means 21, 31 are provided with respective electrical contact coupling elements 211, 311, adapted for the transmission of signals.

The coupling elements 211, 311 may comprise pogo pins and are placed in a specific point or area of the respective electronic circuit board (or other means for processing and conveying signals suitable for the purpose).

In this case, for the purpose of the electrical coupling between the two boards, the contact elements 211, 311 of one must be aligned with those of the other, apart from a shift advantageously permitted by the pogo pins, for example.

In detail, the two boards 210, 310 placed parallel and oriented appropriately in the angular direction around a common central axis C, are connected through direct contact obtained with the pogo pins or other similar means.

This aspect will be looked at again below.

According to preferential but not mandatory constructional modalities, the mentioned cover 32, which constitutes the semi-container of the second part 3, is provided with a central through hole 320 (see FIG. 7), through a sleeve 330 coupled externally to the camera 10 and, from the internal side of the cover 32, to a plate 33 that constitutes the closing element of the internal volume.

In this way, the electronic circuit board 310 (or other electronic means for managing the camera 10), which is on the rear or "internal" face of the closing plate 33, is connected to the inside of the camera 10 by one or more cables that pass into the inside of the aforementioned sleeve 330.

In particular, preferably, the closing element 33 is rotatable about the central axis C, relative to the cover 32.

In this case, the closing element 33 is elastically constrained to the cover 32 for the automatic restoration of a pre-established direction relative to the cover 32, having the central axis C as the reference.

Such elastic constraint can be defined by a spring 34, for example spiral shaped, that connects a point of the closing element 33 to a point of the internal side of the cover 32, which spring is placed on a parallel plane or substantially coplanar to the plane of extension of the closing element 33 itself.

In the preferential embodiment of the invention, the first and the second part 2, 3 are coupled through quick coupling means, preferably of the "bayonet" type.

To be precise, such coupling means is afforded at the internal side of the cover 32 of the second part 3 and at said closing wall(s) 26 present on the front side of the main body 25 of the first part 2 of the unit 1.

Figure 6:
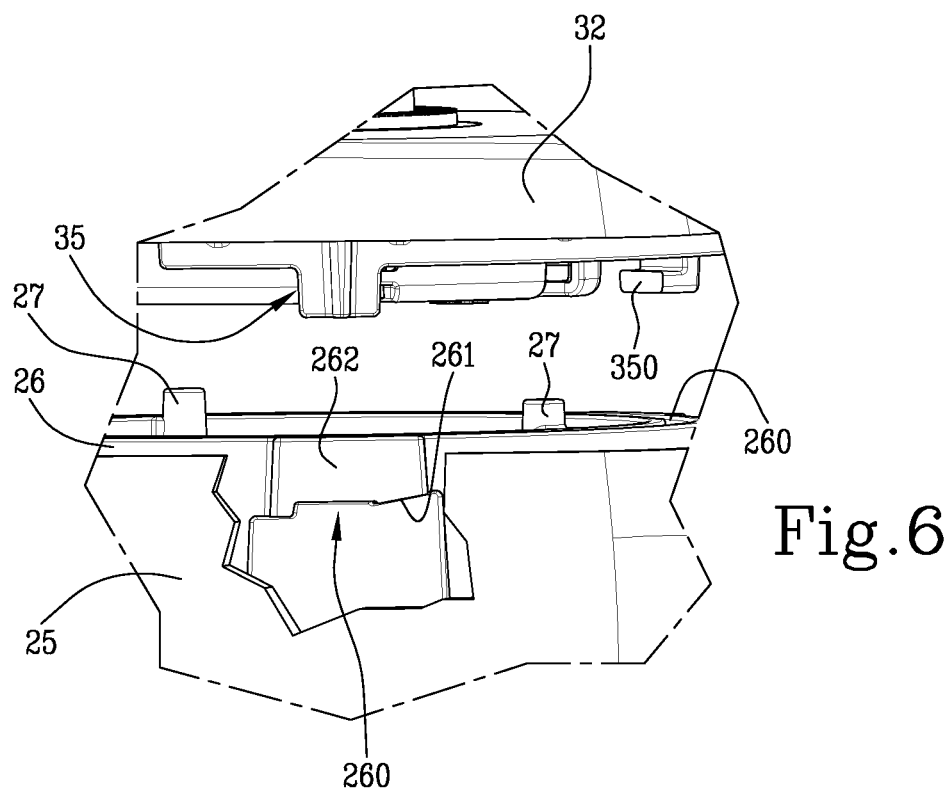
FIG. 6 is a detail of a broken view of the first part of the unit of the invention.

As shown in the appended figures, the quick coupling means comprises both a plurality of hooking elements 35, equipped with respective engagement teeth 350, included in the first part 2 (and in particular in the internal side of the cover 32), and a plurality of engagement surfaces 260, which are afforded on the closing wall 26 of the internal volume and are adapted to be engaged with the engagement teeth 360 (see in particular FIG. 6).

Preferably, the hooking elements 35 have an L-shaped profile, each being constituted by a small plate that rises from the internal side of the cover, which ends in an angled section that defines the related tooth 350.

There may be at least three hooking elements 35 placed along a circumference and angularly spaced, for example at equal distances.

In even more detail, the mentioned engagement surfaces 260 may comprise at least one straight or curved portion 261 which is oblique relative to a central axis C of the closing wall and of the internal volume itself.

Figure 5:
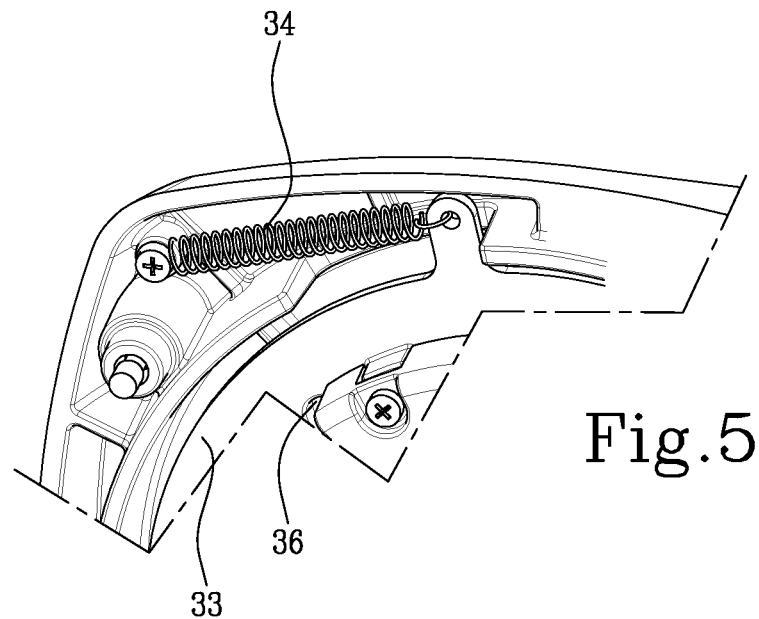
FIG. 5 is an enlarged detail of the previous figure.

In the embodiment shown in FIG. 5, the engagement surfaces 260 are defined by respective rear sides of inserts or "blocks" 262 conformed by the external surface of the closing wall 26 of the internal volume, which inserts 262 are angularly arranged relative to said central axis C.

Preferably, there are more than two of such inserts 262, they are placed along a circumference and are angularly equidistant.

Furthermore, the invention may comprise a means for centering the first and the second part 3 adapted to align the contact elements 211, 311 of the first board 210 with those of the second board 310, allowing a transmission of signals from one to the other.

Preferably, such centering means comprises a plurality of centering pins 27 comprised in the first part 2 of the unit 1 and arranged at the front side thereof.

Preferably, there are at least three of such pins 27, distributed on a circumference.

In even more detail, the pins 27 may be placed at or in proximity to the lateral wall 26 of the internal volume.

In a possible embodiment, the lateral wall 26 conforms the centering pins 27 at the surface of its internal side.

Figure 4:
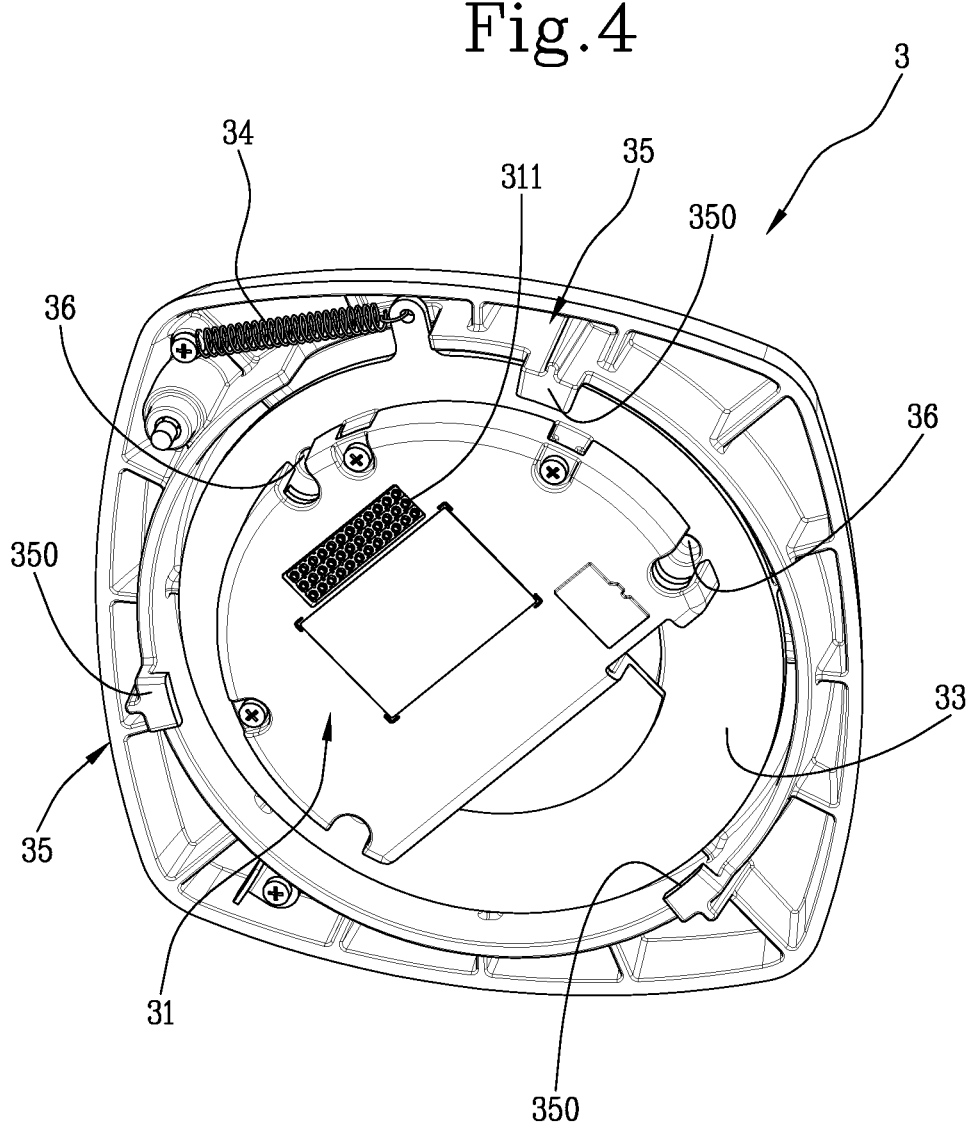
FIG. 4 is an axonometric view from the rear side of the second part of the unit.

The closing element 33 may envisage centering holes 36 (visible in FIG. 4) appropriately arranged so as to receive the related pins 27 to allow the reciprocal centering between the two parts 2, 3 of the unit 1.

The removable coupling between the first and the second part 2, 3 of the unit 1 of the invention is realised through the engagement between the cover 32 and the lateral wall 26 of the internal volume, as described below. In the open configuration of unit 1 proposed, the two parts 2, 3 are separate from one another.

For the purpose of the coupling, the rear side of the second part 3 is brought to the front side of the first part 2, so that the centering holes 36 of the closing element 33 of the internal volume receive the aforementioned centering pins 27, so that the contact elements 211 of the first electronic means 21 are directly facing those of the second electronic means 31.

In this step, the hooking elements 35 of the cover 32 are placed alongside the inserts 262 that bring the aforementioned engagement surfaces 260.

By respectively rotating the first and the second part 2, 3 about the central axis C, the engagement teeth 350 slide along the respective engagement surfaces 360 which, being at least in part oblique relative to the central axis C, impose a reciprocal approaching translation between the two parts 2, 3 of the unit 1 that leads to the sealing closure of the internal volume and, contextually, to the electrical connection between the two boards 210, 310.

In practice, the two parts 2, 3 of the unit 1 are coupled to define the closing configuration, following the centering and a rototranslation that clamps the two parts 2, 3 themselves so that the protective container 25, 32 is defined externally, and internally a closed sealed volume is created where the first and the second electronic means 31, 21 can exchange signals and current for the purpose of the operation of the camera 10 and its connection with the video surveillance system.

Therefore, any type of camera 10, as long as it is equipped with (or associated to) the second part 3 of the unit 1, can be coupled to the first part 2 to define a video surveillance unit 1, 10, connected to the system, provided with a protective container 25, 32 inside which the electronic means 21, 31 is protected from tampering or contact with water or external agents.

In particular, the invention may be used as described below.

The installer applies one or more second parts 2 of the invention at the points in which the cameras 10 are to be positioned in the areas to be watched.

In this step, the front side of the various second parts 2 can be closed by a front cap or sealed by an appropriate cover.

At this point, the installer connects the system to the connectors 22, 23, 24 of the first electronic means 21, placed inside the container 25, 32 and reachable for example through openings 252 afforded on the walls of the main body and closable by caps 253 or other closing means.

After this, based on the type of video surveillance required by the design for the specific areas to be watched, the installer appropriately chooses the cameras 10, associated to the related first parts 2 of the unit 1 proposed and provides for the coupling with the second parts 3 already mounted, according to the modalities explained above (possibly after removing the front cap).

It is therefore clear that the invention provides a universal support and connection unit 1, whose use is independent from the specific type of camera 10 and which allows quick installation and maintenance, as well as the guarantee of the security of the electronic components inside the container 25, 32.

Preferably, the first electronic means 21, and in particular the first board 210, comprises a first memory device for registering the wiring configurations.

In this way, the installer can replace a camera 10, for example because it is damaged, with a new camera 10 equipped with the first part 2 and, once coupled to the second "fixed" part 3, obtain an automatic configuration of the new camera 10 within the system.

Said first memory device may be fixed, i.e. integrated, into the first electronic means 21.

Furthermore, a second memory device 5 may be provided, preferably mobile, such as a micro SD card or the like, in which the video stream filmed by the camera 10 is stored.

Preferably, such second memory device is mounted on the second electronic means 31.

The invention claimed is:

1. A support and connection unit (1) of a camera (10), comprising:
    a first part (2) intended to be fixed to an installation surface, comprising first electronic means (21) for a conveyance of signals and provided with connectors (22, 23, 24) for a transmission of signals outwardly, and
    a second part (3), intended to be coupled to a camera (10), comprising second electronic means (31) connectable to said first electronic means (21) and adapted to convey the signals produced by the camera (10);
    wherein said first and second parts (2, 3) may be removably coupled, thereby defining a closed container (25, 32) which houses said first and second electronic means (21, 31);
    the first and second electronic means (21, 31) being placed in the respective part (2, 3) of said unit (1) so as to mutually connect following coupling of the first and second part (2, 3) wherein the first electronic means (21) comprises at least a first memory device, wherein parameters are registered that are relating to camera wiring configurations to a video-recording system.

2. A support and connection unit (1) of a camera (10), comprising:
    a first part (2) intended to be fixed to an installation surface, comprising first electronic means (21) for a conveyance of signals and provided with connectors (22, 23, 24) for a transmission of signals outwardly, and
    a second part (3), intended to be coupled to a camera (10), comprising second electronic means (31) connectable to said first electronic means (21) and adapted to convey the signals produced by the camera (10);
    wherein said first and second parts (2, 3) may be removably coupled, thereby defining a closed container (25, 32) which houses said first and second electronic means (21, 31);
    the first and second electronic means (21, 31) being placed in the respective part (2, 3) of said unit (1) so as to mutually connect following coupling of the first and second part (2, 3);
    wherein the first part (2) comprises a bottom (250) from which perimeter containment walls (251) are rising, thus defining a semi-container (25) which comprises one or more lateral closing walls (26) which circumscribe the first electronic means (21), thereby defining an access passage;
    wherein the second part (3) comprises a semi-container (32) having a first side from which, in use, said camera (10) is protruding and a second side wherein a closing element (33) is present, which has a side whereon second electronic means are fixed (31), said closing element (33) being adapted to abut said lateral closing wall or walls (26), thus sealingly closing said passage, thereby defining an internal volume that houses the first and second means mutually connected as a result of the coupling between the first and second part (2, 3) of the unit (1).

3. A unit (1) according to claim 1, comprising quick coupling means (35, 260) for coupling the first and second part (2, 3) one to another.

4. A unit (1) according to claim 3, wherein said quick coupling means (35, 260) is adapted to engage the first part (2) to said closing wall or walls (26).

5. A unit (1) according to claim 4, wherein said quick coupling means comprises a plurality of hooking elements (35), provided with respective engagement teeth (350) and comprised within said first part (2), as well as a plurality of engagement surfaces (260), formed on said closing wall or walls (26) adapted to engage with said engagement teeth (350).

6. A unit (1) according to claim 5, wherein said surfaces (260) comprise at least one straight or curved portion (261), which is oblique relative to a central axis (C) of the closing wall (26) of said closed volume.

7. A unit (1) according to claim 1, in which the first and second electronic means (21, 31) comprises respective electrical coupling elements (211, 311) in mutual contact, suitable for the transmission of signals.

8. A unit (1) according to claim 7, in which said coupling elements (211, 311) comprise a pogo pin.

9. A unit (1) according to claim 7, comprising centering means (27, 36) of the first and second part (2, 3), adapted to allow alignment of the electrical coupling elements (211, 311).

10. A unit (1) according to claim 9, wherein said centering means comprises a plurality of centering pins (27) distributed in said first part (2).

11. A unit (1) according to claim 10, wherein the first part (2) comprises one or more lateral closing walls (26) which circumscribe the first electronic means (21), thereby defining an access passage, whilst the second part (3) comprises a closing element (33) having a side whereon second electronic means are fixed (31), said closing element (33) being adapted to abut said lateral closing wall or walls (26), thus sealingly closing said passage, thereby defining an internal volume that houses the first and second means mutually connected as a result of the coupling between the first and second part (2, 3) of the unit (1), and wherein said closing element (33) of the second part (3) comprises holes (36) adapted to receive each a respective centering pin (27).

12. A video recording unit (10), comprising a unit (1) according to claim 1 and a camera (10) solidly associated to the second part (3) of the unit (1).

13. A support and connection unit (1) of a camera (10), comprising:
    a first part (2) intended to be fixed to an installation surface, comprising first electronic means (21) for a conveyance of signals and provided with connectors (22, 23, 24) for a transmission of signals outwardly, and
    a second part (3), intended to be coupled to a camera (10), comprising second electronic means (31) connectable to said first electronic means (21) and adapted to convey the signals produced by the camera (10);

wherein said first and second parts (2, 3) may be removably coupled, thereby defining a closed container (25, 32) which houses said first and second electronic means (21, 31);

the first and second electronic means (21, 31) being placed in the respective part (2, 3) of said unit (1) so as to mutually connect following coupling of the first and second part (2, 3);

wherein the first electronic means includes an electronic circuit board (210) and is adapted to transmit the power to the camera (10), said connectors conveying the power supply current and telecommunication network signals;

wherein the second electronic means comprises an electronic circuit board (310) adapted to receive the power from the first electronic means for the purpose of the operation of the camera.

\* \* \* \* \*